US009361588B2

(12) United States Patent
Klopotek (10) Patent No.: US 9,361,588 B2
(45) Date of Patent: Jun. 7, 2016

(54) CONSTRUCTION OF TREE-SHAPED BAYESIAN NETWORK

(71) Applicant: International Business Machines Corporation, Armonk, NY (US)

(72) Inventor: Mieczyslaw Klopotek, Nowy dwor Mazowiecki (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 211 days.

(21) Appl. No.: 14/170,676

(22) Filed: Feb. 3, 2014

(65) Prior Publication Data

US 2014/0222751 A1      Aug. 7, 2014

(30) Foreign Application Priority Data

Feb. 5, 2013   (GB) .................................. 1301987.2

(51) Int. Cl.
*G06N 5/02*   (2006.01)
*G06N 7/00*   (2006.01)

(52) U.S. Cl.
CPC ...................................... *G06N 7/005* (2013.01)

(58) Field of Classification Search
CPC ......... G06N 7/005; G06N 5/02; G06N 5/025; G06N 5/04
USPC .......................................................... 706/59
See application file for complete search history.

(56) References Cited

U.S. PATENT DOCUMENTS

| 7,870,081 | B2 | 1/2011 | Li et al. |
| 8,005,770 | B2 | 8/2011 | Minh et al. |
| 2005/0131848 | A1* | 6/2005 | Chickering ........... G06N 99/005 706/12 |
| 2005/0216496 | A1* | 9/2005 | Chickering ............. G06N 7/005 |
| 2009/0307160 | A1* | 12/2009 | Minh ...................... G06N 7/005 706/12 |
| 2010/0198761 | A1* | 8/2010 | Meng ...................... G06N 7/005 706/12 |
| 2011/0016153 | A1* | 1/2011 | Atta ................... G06F 17/30589 707/797 |
| 2012/0185489 | A1* | 7/2012 | Shah ...................... G06Q 10/06 707/749 |

OTHER PUBLICATIONS

Klopotek M. et al., "An Algorithm for Parallel Tree-Shaped Bayesian Network Construction", Emerging Intelligent Technologies in Industry, SCI 369, pp. 167-184, 2011.*
Klopotek M., "Mining Bayesian Network Structure for Large Sets of Variables", ISMIS 2002, LNAI 2366, pp. 114-122, 2002.*
Alcobe J., "An Incremental Algorithm for Tree-shaped Bayesian Network Learning", ECAI, 2002.*

(Continued)

*Primary Examiner* — Stanley K Hill
*Assistant Examiner* — David Misir
(74) *Attorney, Agent, or Firm* — Cantor Colburn LLP; Yeen Tham (57) ABSTRACT

Embodiments relate to constructing a tree-shaped Bayesian network from variables associated with conditional dependencies in a given data set, the constructing being performed by a plurality of processors in parallel. An aspect includes assigning a plurality of variables as nodes to a respective plurality of processors. Another aspect includes operating the plurality of processors in a parallel manner to determine a correlation for each pair of nodes. Another aspect includes M variables that are randomly selected as primary nodes defining (M+1) sub-trees. Another aspect includes in each sub-tree the plurality of processors are operated in a parallel manner to determine a correlation for the remaining nodes with each of the primary nodes and to allocate each remaining node to one of the (M+1) sub-trees.

9 Claims, 6 Drawing Sheets

(56) References Cited

OTHER PUBLICATIONS

C. Chow, et al., "Approximating Discrete Probability Distributions with Dependence Trees," IEEE Transactions on Information Theory, vol. IT-14, No. 3, May 1968; pp. 462-467.

K. Huang, et al., "Constructing a Large Node Chow-Liu Tree Based on Frequent Itemsets," Proceedings of the 9th International Confrernce on Neural Information Processing (ICONIP'02), vol. 1; pp. 498-502.

M. Klopotek, et al., "A New Space-Saving Bayesian Tree Construction Method for High Dimensional Data," Demonstratio Mathematica, vol. 35, No. 3 (2002) pp. 671-684.

M. Klopotek, et al., "A New Bayesian Tree Learning Method with Reduced Time and Space Complexity," Fundamenta Informaticae XXI (2001) pp. 1001-1019.

M. Meila, "An Accelerated Chow and Liu Algorithm: Fitting Tree Distributions to High-Dimensional Sparse Data," Proceedings of the sixteenth Internation Conference on Machine Learning, Morgan Kauffman, pp. 249-257.

* cited by examiner

CONSTRUCTION OF TREE-SHAPED BAYESIAN NETWORK

PRIORITY

This application claims priority to Great Britain Patent Application No. GB 1301987.2, filed Feb. 5, 2013, and all the benefits accruing therefrom under 35 U.S.C. §119, the contents of which in its entirety are herein incorporated by reference.

BACKGROUND

The present disclosure relates generally to baysian networks, and more specifically, to a framework for learning a simple Bayesian network from data in parallel in a massively parallel processing (MPP) architecture.

Bayesian networks are probabilistic graphical models representing a set of random variables and their conditional dependencies. The variables of the Bayesian network can be continuous or discrete. In general a Bayesian network is found that fits best to given data, i.e. to learn the desired Bayesian network from given data. This learning process is accomplished by massively parallel data processing being performed by a large number of processors, such as hundreds or thousands, which conduct a set of coordinated computations in parallel. The processors may be arranged in a MPP architecture.

BRIEF SUMMARY

Embodiments relate to constructing a tree-shaped Bayesian network from variables associated with conditional dependencies in a given data set, the constructing being performed by a plurality of processors in parallel. An aspect includes assigning a plurality of variables as nodes to a respective plurality of processors. Another aspect includes operating the plurality of processors in a parallel manner to determine a correlation for each pair of nodes. Another aspect includes M variables that are randomly selected as primary nodes defining (M+1) sub-trees. Another aspect includes in each sub-tree the plurality of processors are operated in a parallel manner to determine a correlation for the remaining nodes with each of the primary nodes and to allocate each remaining node to one of the (M+1) sub-trees.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

Various embodiments will now be described, by way of example only, with reference to the following drawings in which.

DETAILED DESCRIPTION

Embodiments disclosed herein provide a method, a computer system, and a computer program for learning a Bayesian network from a given data set in a MPP system.

Embodiments provide a method for constructing a tree-shaped Bayesian network from variables associated with conditional dependencies in a given data set by a plurality of processors in parallel, the method comprising: assigning a plurality of variables as nodes to a respective plurality of processors; and operating the plurality of processors in a parallel manner to determine a correlation for each pair of nodes; wherein in a first block M variables are randomly selected as primary nodes defining (M+1) sub-trees; in a second block in each sub-tree the plurality of processors are operated in a parallel manner to determine a correlation for the remaining nodes with each of the primary nodes and to allocate each remaining node to one of the (M+1) sub-trees; and the first and second blocks are iteratively repeated for each sub-tree until all nodes are linked in said tree-shaped Bayesian network.

In an embodiment, the initial value of M equals 2 in the very first block thus defining 3 sub-trees. In an embodiment, the initial value of M is less than or equal to the square root of the number of variables in the data set.

Embodiments further provide a computer system for constructing a tree-shaped Bayesian network from variables associated with conditional dependencies in a given data set by a plurality of processors in parallel, the computer system comprising: a plurality of processors to which a respective plurality of variables is assigned to as nodes; and control means for operating the plurality of processors in a parallel manner to determine a correlation for each pair of nodes; wherein the control means randomly selects M variables as primary nodes defining (M+1) sub-trees; operates the plurality of processors in a parallel manner to determine a correlation for the remaining nodes with each of the primary nodes and to allocate each remaining node to one of the (M+1) sub-trees in each sub-tree; and iteratively repeats the blocks of selecting and operating for each sub-tree until all nodes are linked in said tree-shaped Bayesian network.

In an embodiment, the control means may set the initial value of M to 2 thus defining 3 sub-trees. In an embodiment, the control means may set the initial value of M to less than or equal to the square root of the number of variables in the data set.

Embodiments further provide a computer program product causing a computer system to perform the method described above.

Even if unfavourable variables have been selected as primary nodes, various embodiments may help achieve the desired Bayesian network after a relatively short run time than comparable prior art algorithms. In some embodiments, the number of computations of correlations can be reduced from N Square to N log N.

In the following, like numbered elements in these figures are either similar elements or perform an equivalent function. Elements which have been discussed previously will not necessarily be discussed in later figures if the function is equivalent. The terms "node" and "variable" are used as equivalent to each other if not stated otherwise.

An aspect of some embodiments is the parallelism of algorithms in MPP architecture systems. The Data Warehouse MPP architecture assumes that the database tables are distributed over so-called data slices each of them being served by a separate processor. The distribution of a table is row-wise (record-wise), that is, a given table has an identical structure in each data slice, but different subsets of records of the same table are stored on different data slices. The processors do not share any records, but the control mechanism can make them exchange bulk data with other processors and a central processor that has also some record processing capabilities. Parallel processing in such architecture is achieved if a task of data processing can be split into subtasks that are identical algorithmically, but can be applied separately to subsets of data. Thereafter the results of the subtasks are combined to yield the overall result. The parallelization of an algorithm is reasonable if the amount of data from the subtasks is considerably smaller than the amount of data that is processed within each data slice. Tasks like computing the average, standard deviation, maximum, minimum etc. fall into this category of tasks.

It is to be noted however that in MPP architecture not necessarily each record is assigned exclusively to a single data slice. Instead, usually two copies of the same record are available at different data slices for data safety reasons. Yet, the copy is used for recovery operations, and only the primary record is available for processing, so that the copy does not affect the solution in any way having regard to data processing logic.

Some embodiments accelerate the learning process of a certain class of Bayesian networks (BN) from data that are stored row-wise in a database—specifically those with a tree structure (single linked, subsequently referred to as tree-shaped Bayesian network, or TBN). For such data the joint probability distribution in variables X1, . . . , Xn has the underlying directed acyclic graph structure of a tree.

The learning process is based on calculating correlations between variables. To compute the correlation between two variables, one needs to compute their variances and the covariance between them. To compute the variance of variables, it is necessary to compute the sum of squares, the sum of values and the number of records for the variables. To compute the covariance of variables, it is necessary to compute in addition the sum products of values of the variables in each row. Therefore the operation to be performed is essentially summing up results that are computed in each row, and then, at the end of computation, still a couple of basic operations on the five resulting sums have to be conducted in order to get the desired correlation result.

Since the operation of addition is cumulative and associative, instead of processing the variables row by row, the sum of the variables may be computed. Computation of the sum of variables may be performed by tens or hundreds of processors that compute partial sums of records being exclusively assigned to each of them in parallel. The resulting partial sums are then summed up in one single process, thus significantly accelerating the process on the whole.

This general approach can be applied to parallelization of tree-Shaped Bayesian network (TBN) learning from given data. One example for a TBN-learning algorithm that can be enhanced by the above approach is the Chow-Liu algorithm. First, correlations for each pair of variables can be computed and, secondly, a network is constructed picking up node by node as a function of their correlations to variables that are currently part of the network. This second block is basically a sequential process, although for a large data set this is not a big overhead.

A direct parallelization of the first stage consists e.g. in a parallel computation of correlations for each pair of variables. That is, for the records that are assigned to it each processor computes partial sums of variables, variable products, and squares of variables for each pair of variables. For each pair with both variables being non-null the number of records has to be counted, if missing values are permitted. In a final process these sums are combined for each pair of variables in order to obtain all the correlations.

The above procedure reduces the time that is necessary for the retrieval of records since each record is read only once for N variables, whereas a naive approach necessitates that each record being read N*N/2 times.

This direct parallelization has however two considerable drawbacks: the number of cells to maintain the final results (the correlations) and the partial results (the partial sums) grows quadratically with the number of variables. This increase may become considerable if the number of variables reaches the range of some ten thousands. The other problem is that the number of multiplications to be performed grows also quadratically with the number of variables. The quadratic growth of the number of arithmetical operations (with major weight on multiplications) does affect not only the parallel solution but also the sequential one.

A number of approaches were made to reduce the number of these operations. The reduction essentially takes advantage of the properties of the tree, namely that some correlations need not be computed at all if the values of some others are known beforehand. These solutions, however, turn out to be prohibitive for parallelization because all correlations are available at the same time when the algorithm reaches its final stage. Hence, either one has to compute all correlations, which saves access time for the multiple reading of the same record, or the number of correlations is reduced at the expense of reading each record over and over again from the disk for each correlation.

Embodiments provide a process in which the number of computed correlations is reduced, and at the same time multiple correlations are computed in a single pass through the data. This approach has been developed taking the following observations into account. The removal of a single node from a tree splits the tree into two separate sub-trees. If one could tell to which of the sub-trees each variable belongs, then the sub-trees could be constructed in parallel. Splitting the sub-trees again the sub-sub-trees could be constructed in the same way also in parallel, and so on. Splitting trees into sub-trees and sub-sub-trees reduces the number of correlations to be computed, because correlations need not be computed if variables belong to different sub-trees.

Given a single variable that splits a tree into sub-trees it is not possible to tell to which sub-tree the remaining variables belong. But if we take two variables to split the tree into three sub-trees, it is possible to assign the rest of the variables to one of the sub-trees. Namely, if the tree is split into three sub-trees, one sub-tree may be linked with a first "split variable", one sub-tree with the second "split variable", and one sub-tree with both "split variables". If one of the remaining variables correlates to the first split variable more strongly than to the second split variable by the "factor" of mutual correlation between the first and the second, then it belongs to the sub-tree that is linked to the first split variable. If it correlates more strongly to the second variable, then the remaining variable belongs to the sub-tree that is linked to the second variable. And if it correlates as strongly to the first as to the second split variables it belongs to the sub-tree that is linked to both split variables.

In terms of an algorithm that splits the variables into three sub-trees, one first has to pick-up (randomly) two split variables. Then in parallel, as described above, the correlations of the remaining variables to the two split variables are computed. That is, with N variables 2*(N−2)+1 correlations are to be computed. Once the decision is made and all remaining variables have been assigned to one of the sub-trees each of these sub-trees is processed in the very same way. Obviously this algorithm is suitable for parallelization. For two split variables and three sub-trees of N1, N2, N3 nodes each (i.e. in total N1+N2+N3+2 nodes), 2*(N1−2)+2*(N2−2)+2*(N3−2)+3=2*(N−8)+3 correlations are to be determined on a first level. This process may be conducted in parallel by a respective plurality of processors and will be repeated on every following level in a similar way until all nodes have been assigned. With each level the number of correlations to be computed decreases. In the optimum log_3 (N) (i.e. logarithm to base 3 of N) blocks are necessary to assign all nodes and build the desired Bayesian network. In other words, most of the N*N correlations can be disregarded.

Modifications of this approach are possible. For N+M variables M split variables can be employed to split the initial tree into a respective number of sub-trees instead of only two split variables. For M selected split variables M*(M−1)/2 split variable correlations are computed in addition to the correlations of the other N variables. By the selected M split variables the tree is split into (M+1) sub-trees. In the subsequent process the remaining N variables are allocated to these (M+1) primary sub-trees. The process may be repeated then to split the primary sub-trees into (M+1)*(M+1) sub-sub-trees. (It is assumed here for the sake of brevity that the number of split variables is constantly chosen to be M. However, it is obvious to a person of ordinary skills that this need not be necessarily so, but the number of split variables can be made dependent on various aspects such as the number of remaining nodes and available processors instead.) The process of determining the sub-tree structure is then the same as the process of determining the tree structure, and so on.

The computations of the necessary correlations for each sub-tree can be implemented in a parallel architecture system. Such systems also allow variations of the algorithm like differing numbers M of splitting points at each tree hierarchy level.

In the following an example with two initial split variables will be elaborated with reference being made to the Figures.

Figure 1:
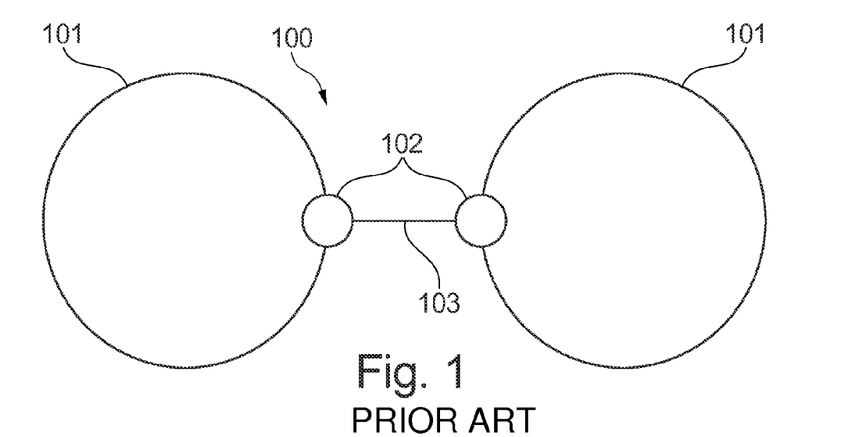
FIG. 1 illustrates the first block of subdividing a Bayesian tree into two sub-trees according to an embodiment of an edge tree construction (ETC) algorithm.

The prior art algorithm with the least complexity so far is the original ETC algorithm by Klopotek. The original ETC algorithm is based on the assumption that a tree can be sub-divided into two sub-trees by an edge. This is illustrated in FIG. 1. FIG. 1 shows a tree 100 that is split up into two sub-trees 101. Each of the sub-trees 101 has a primary node 102 at one end thereof. Through the primary nodes 102 both primary sub-trees are linked together via a primary edge 103 spanning between the primary nodes 102. For instance the sub-tree 101 on the left contains an upper part of a Bayesian tree 100, and the sub-tree 101 on the right contains a lower part of the tree 100.

Figure 2:
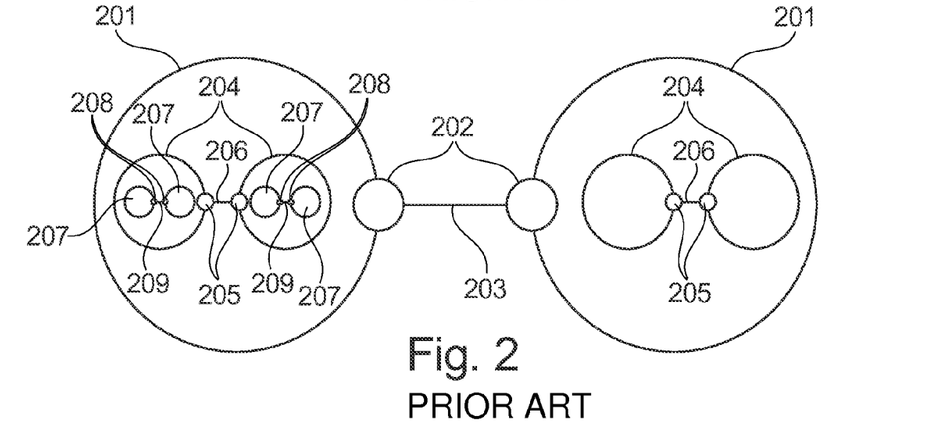
FIG. 2 illustrates the two sub-trees of FIG. 1 according to an embodiment of the present invention.

Apparently this sub-division of tree 100 can be recursively repeated and the result thereof is represented as a nested structure in FIG. 2. FIG. 2 shows a tree that is split up into two sub-trees 201. Each of the sub-trees 201 has a primary node 202 at one end thereof. Through the primary nodes 202 both primary sub-trees are linked together via a primary edge 203 spanning between the primary nodes 202. Both primary sub-trees 201 are sub-divided into two secondary sub-trees 204 each. (It is to be noted here however, that the number of secondary sub-trees 204 in each of the primary sub-trees 201 need not necessarily be the same but can be made dependent on various parameters.) Each secondary sub-tree 204 includes a secondary node 205 through which the secondary sub-tree 204 is linked with its respective counterpart via a secondary edge 206.

In addition to the second sub-division of the tree into secondary sub-trees 204 FIG. 2 also shows in its left part an additional third sub-division of the secondary sub-tree 204 into two tertiary sub-trees 207. (Again, the number of tertiary sub-trees 207 need not necessarily be the same in both secondary sub-trees 204 but can be made dependent on various parameters.) In analogy to the secondary sub-trees 204 both tertiary sub-trees 207 include tertiary nodes 208 at their end through which they are linked with their respective counterpart via a tertiary edge 209 spanning between the tertiary nodes 208.

The illustration in FIGS. 1 and 2 show schematically the process of repeated sub-division of sub-trees resulting in nested structures. This process can be carried on until all nodes are made part of one of the n-ary sub-trees.

Figure 3:
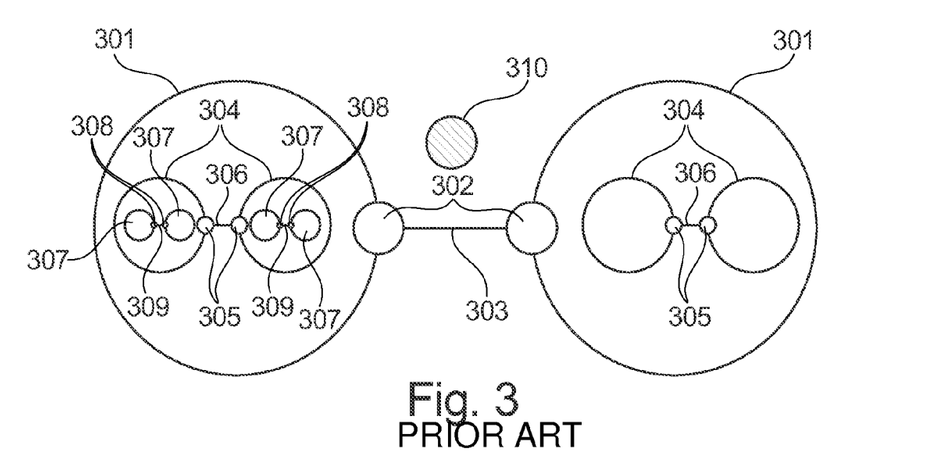
FIG. 3 illustrates the second block of an embodiment of an ETC algorithm.

If a new node is to be integrated in an existing tree structure that already comprises a plurality of n-ary sub-trees, the node is compared or correlated, respectively, to the two nodes at the end of the edge that links the two primary sub-trees in order to decide to which of the sub-trees the new node belongs. This scenario is depicted in FIG. 3. Each of the sub-trees 301 has a primary node 302 at one end thereof. Through the primary nodes 302 both primary sub-trees are linked together via a primary edge 303 spanning between the primary nodes 302. Both primary sub-trees 301 are sub-divided into two secondary sub-trees 304 each. Each secondary sub-tree 304 includes a secondary node 305 through which the secondary sub-tree 304 is linked with its respective counterpart via a secondary edge 306. Further, the secondary sub-trees 304 on the left are split into two tertiary sub-trees 307. Both tertiary sub-trees 307 include tertiary nodes 308 at their end through which they are linked with their respective counterpart via a tertiary edge 309 spanning between the tertiary nodes 308.

In FIG. 3 a newly introduced variable 310 is shown (black circle) that is to be integrated in the Bayesian network as new node. The new node 310 is compared first to the two primary nodes 302, and then the node 310 is allocated to one of the sub-trees 301. The two possible results of the comparison are shown in FIGS. 4A and 4B.

Figure 4A:
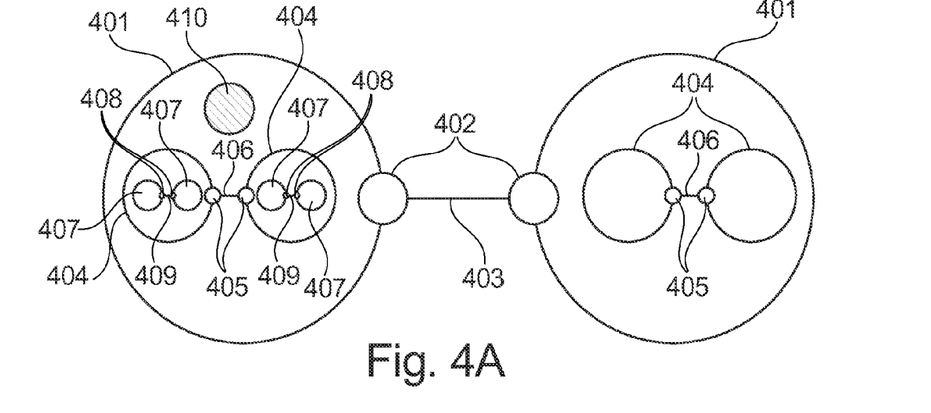
FIG. 4A illustrates a first alternative result of the second block in FIG. 3 according to an embodiment of the present invention.
Figure 4B:
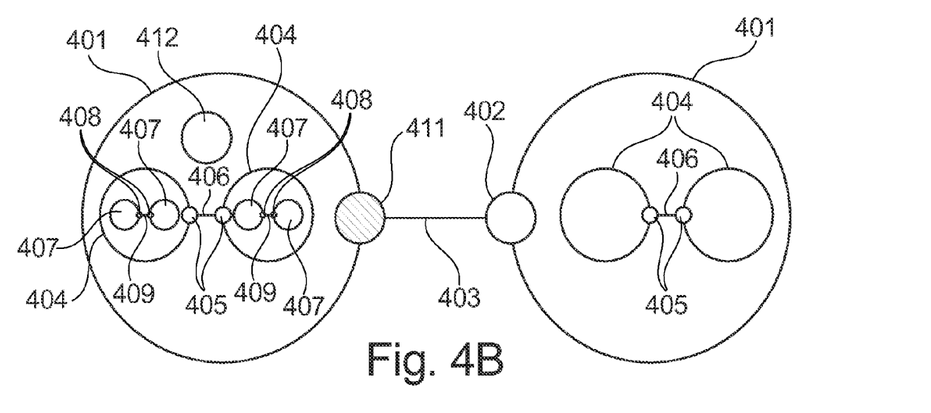
FIG. 4B illustrates a second alternative result of the second block in FIG. 3 according to an embodiment of the present invention.

In FIG. 4A each of the sub-trees 401 has a primary node 402 at one end thereof. Through the primary nodes 402 both primary sub-trees are linked together via a primary edge 403 spanning between the primary nodes 402. Both primary sub-trees 401 are sub-divided into two secondary sub-trees 404 each. Each secondary sub-tree in turn 404 includes a secondary node 405 through which the secondary sub-tree 404 is linked with its respective counterpart via a secondary edge 406. Further, the secondary sub-trees 404 on the left are split into two tertiary sub-trees 407. Both tertiary sub-trees 407 include tertiary nodes 408 at their end through which they are linked with their respective counterpart via a tertiary edge 409 spanning between the tertiary nodes 408.

It is assumed that the newly introduced variable 410 (black circle) is allocated to the left sub-tree 401 where it may either become part of the sub-tree as new node or replace the primary node thereof.

In FIG. 4A the new node 410 has been classified as belonging to the primary sub-tree 401 on the left side. That is, node 410 is correlated more strongly to the nodes that are part of the primary sub-tree 401 on the left side than to the nodes that are part of the primary sub-tree 401 on the right side. Since however node 410 in FIG. 4A has not yet found its final destination, once it has been recognized as being part of the left primary sub-tree 401, it will be compared to both secondary nodes 405 that link the two secondary sub-trees 404 to each other. This procedure will be repeated as often as necessary until node 410 has eventually found its final place.

An alternative scenario is shown in FIG. 4B. There it has been immediately found that new node 411 (black circle) is more strongly correlated to the primary node 402 of the primary sub-tree 401 on the right side but less strongly to the other nodes that are part of the left primary sub-tree 401 than the original node 402. Thus new node 411 replaces the former primary node at this side of primary edge 403, and the former primary node becomes a "travelling" node 412 that has not yet been assigned to a final place in the primary sub-tree 401 on the left. Hence, node 412 is pushed down to a "single edge" sub-tree.

This approach makes it unnecessary that correlations with all the nodes of the "so-far tree" must be computed as the computation is restricted to one single branch of the edge tree.

However, this approach allows only processing of one node at a time so that in a row-wise representation of input data this may be disadvantageous because of the impact of multiple passes through the database, especially if the Chow-Liu algorithm has been chosen as a working basis.

Since the ETC algorithm as well as other comparable algorithms requires input of column-wise ordered data, whereas standard MPP architecture is designed to deliver data in a row-wise order, a new approach must be found to reduce the complexity of computing correlation values of huge data sets that no longer requires a column-wise input.

The most important factor for influencing the complexity of learning a Bayesian network is the number of correlations to be computed rather than the number of records. According to various embodiments, a modified ETC algorithm is adapted to the present standard MPP architecture, e.g. Netezza Box architecture, in such a way that the parallelism is fully exploited.

The modified ETC algorithm differs from the original algorithm in that the nodes are passed down the tree structure together, using one pass through the data for pushing nodes one level down, instead of inserting nodes into an initial a-priori model of a tree. Whereas the original ETC algorithm constructs a tree of edges rather than of nodes the modified ETC algorithm is based on the processing of a plurality of not yet inserted nodes in parallel.

The new method consists in parallel processing of not yet inserted or pushed down edges. A first "generalized" edge (in fact a sub-tree delimited by two nodes) will be picked up at random. So far inserted "generalized" edges will be processed in parallel. Like with the ETC algorithm all nodes pass through the top edge, go left, right or (unlike ETC) to the middle. Multiple passing through the data set is required, but the number of passes depends on the tree depth. Hence it is envisaged that the time complexity goes down to log-linear and is no longer quadratic in the number of variables as the known Chow-Liu algorithm. With thousands of variables this is an advantage of several orders of magnitude in execution time.

Figure 5:
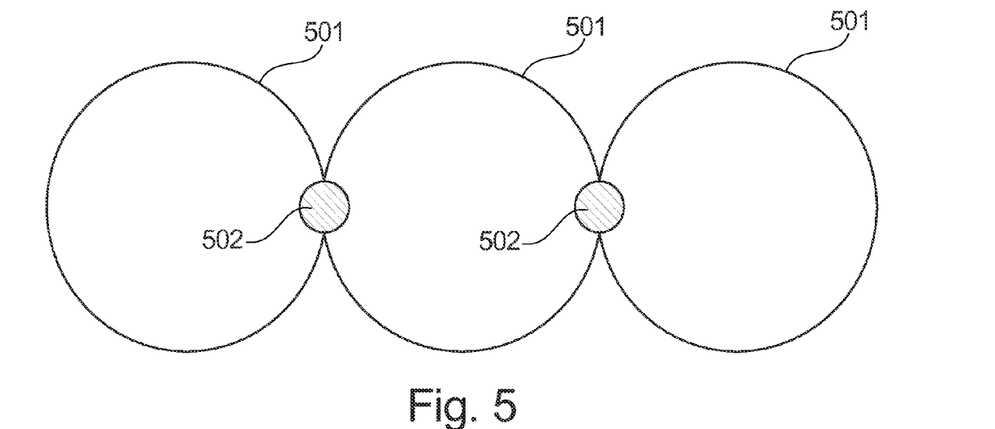
FIG. 5 is a schematic representation of the first algorithm block according to an embodiment of the present invention.

FIG. 5 shows a tree being separated into three sub-trees 501. The three sub-trees 501 are pair-wise connected by primary nodes 502 (black circles), i.e. one node 502 is located between two neighbouring sub-trees 501, respectively. The trees can be nested analogously to the representation above in FIGS. 2, 3, 4A, 4B. In order to come to this preliminary structuring two nodes are picked from an existing data set.

Figure 6:
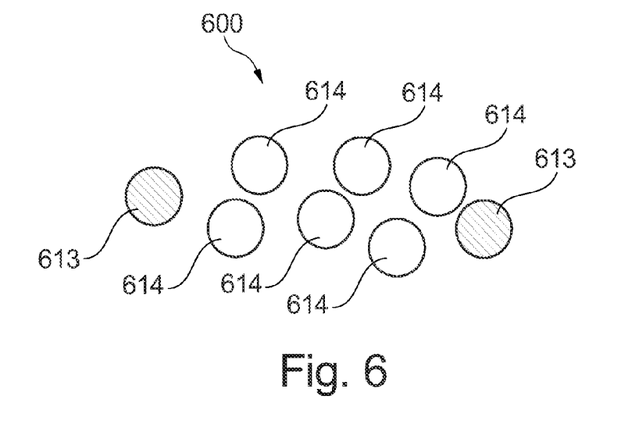
FIG. 6 depicts schematically a data set to which a Bayesian network is to be found according to an embodiment of the present invention.

Such data set is shown in FIG. 6 as data set 600. Data set 600 comprises a plurality of variables 613 and 614. Variables 613 (black circles) are selected from data set 600 and are designated as split variables that connect neighbouring sub-trees. In a second block remaining variables 614 will be inserted in the sub-trees depending on their correlation with the selected split variables 613.

Figure 7:
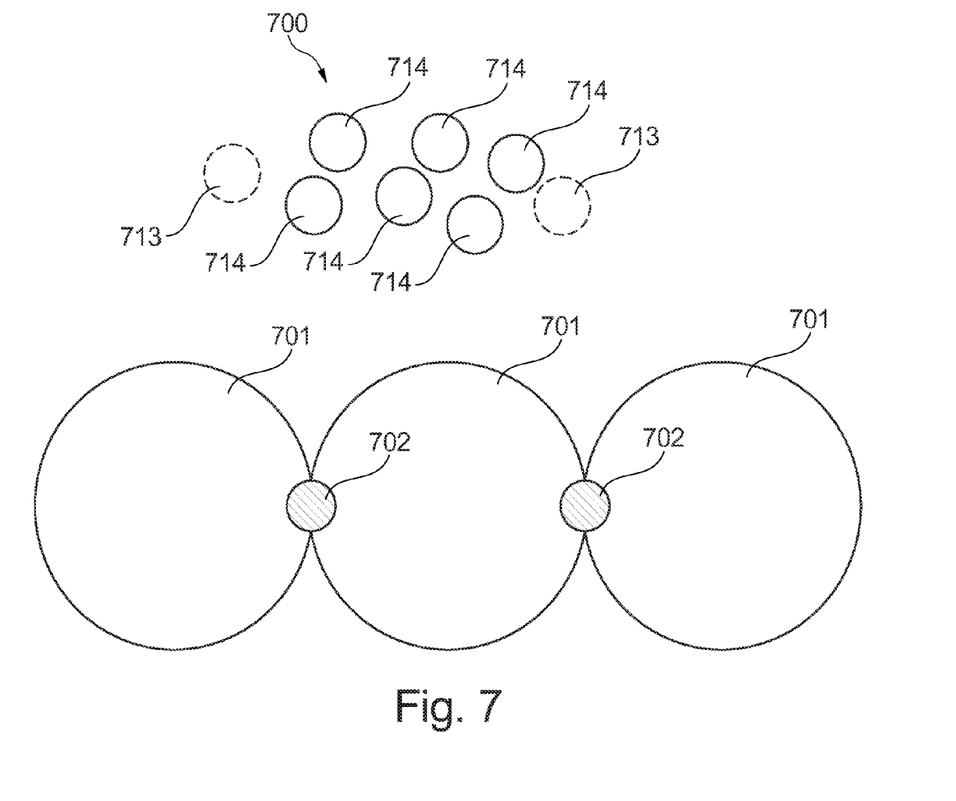
FIG. 7 illustrates the selection process according to an embodiment of the present invention.

This is considered in FIG. 7 showing a data set 700 with variables 713 and 714. Variables 713 (dashed circles) have been removed from the data set 700 already and have become split variables 702 (black circles) that connect the neighbouring sub-trees 701. The other nodes 714 are assigned to one of three sub-trees 701 in a process that considers all remaining nodes 714 in parallel. That is, in a single pass through the data set 700 those correlations can be computed that are needed to assign the remaining data 714 to the respective sub-trees 701.

Figure 8:
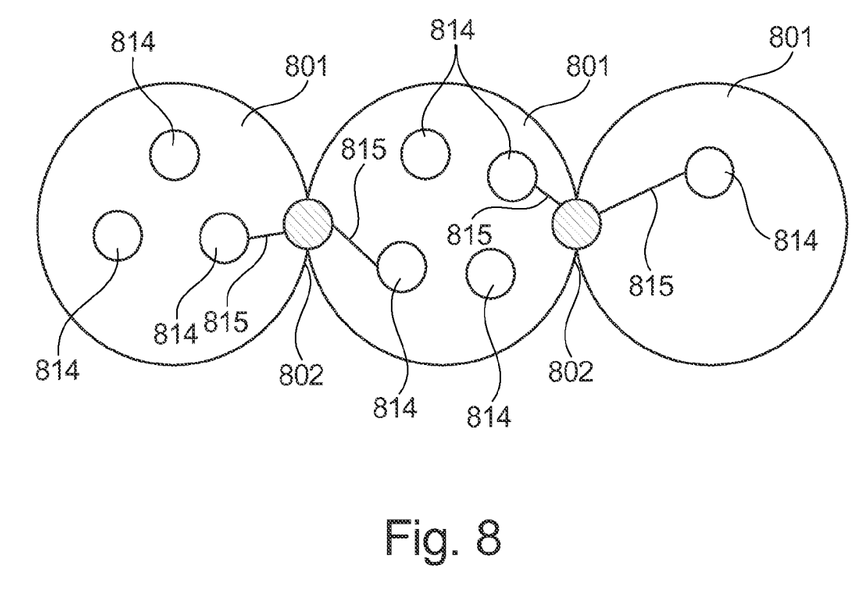
FIG. 8 shows schematically a set of nodes being allocated to various sub-trees after the second algorithm block according to an embodiment of the present invention.

The (intermediary) result of the process that was started in FIG. 7 is shown in FIG. 8. The sub-trees 801 have been filled with the according number of remaining data 814, whereas the sub-trees 801 are linked by primary nodes 802 (black circles). The primary nodes 802 in turn are linked to particular elements of the remaining nodes 814 by respective Bayesian edges 815. At this stage the procedure is repeated in parallel (single pass) for each of the sub-trees 801 until the sub-trees also have a well ordered structure.

It is to be noted that nodes allocated to sub-trees will not be compared to nodes in other sub-trees, thus saving considerable computational time.

Figure 9:
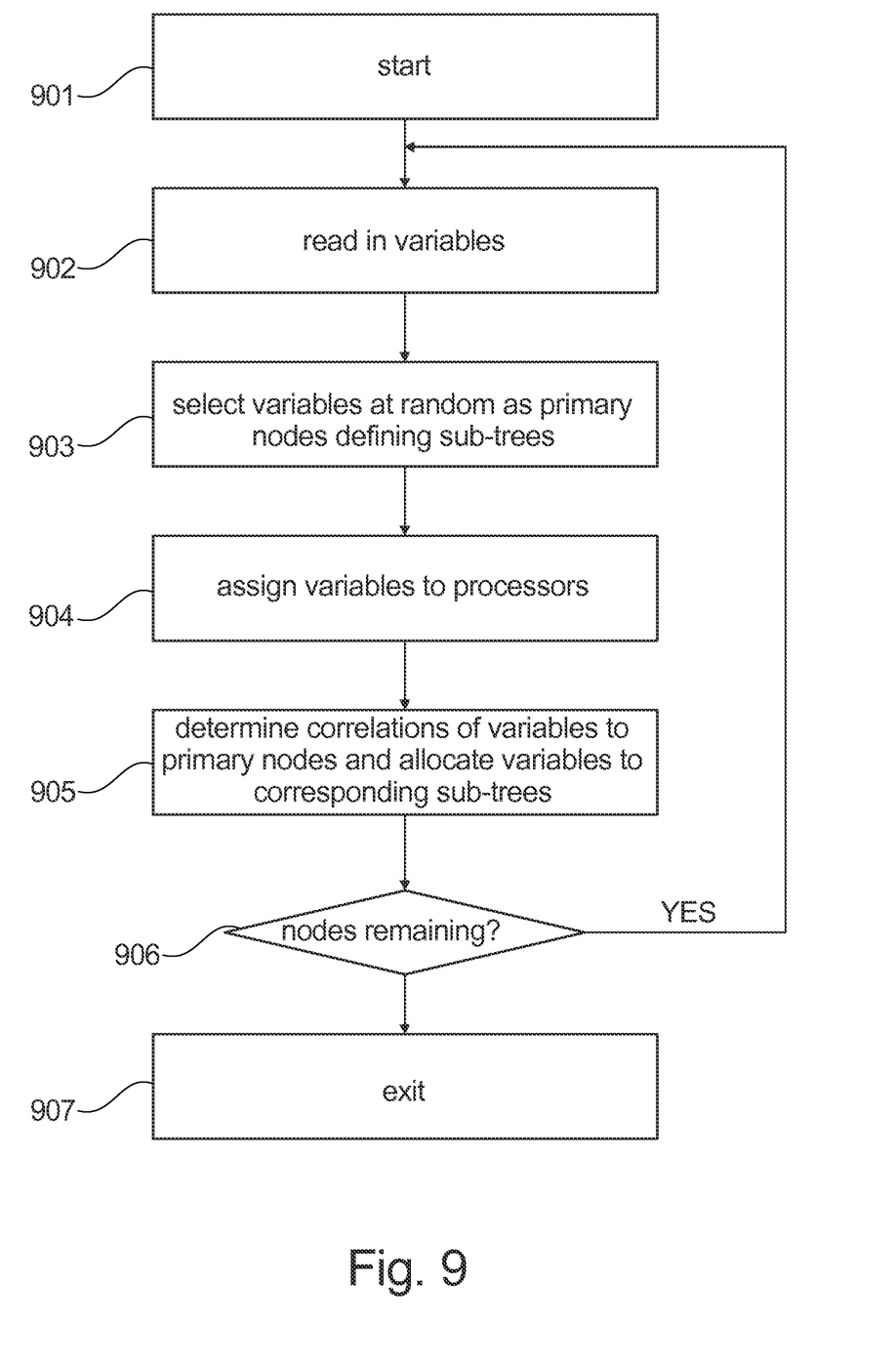
FIG. 9 is a flow chart of an embodiment of the tree-shaped Bayesian network construction method according an embodiment of the present invention.

FIG. 9 shows the flow chart of an embodiment of the tree-shaped Bayesian network construction method. The method starts at block 901 where the construction procedure is initiated. In block 902 variables are read in that are to be processed in the rest of the procedure. A predetermined part of the read in variables is selected and assigned as nodes at block 903. The selected nodes are buffered in a separate node memory and are made available to the procedure as required. The remaining variables, i.e. those variables that are not selected at block 903, are assigned to processors working in parallel on a plurality of data at block 904. At block 905 the processors determine the correlations of the non-selected variables to the selected nodes and, depending on the respective correlation values, allocate the non-selected variables to one or two of the nodes and thus to one of the sub-trees being defined by the nodes. Upon completion of this process at block 906 the procedure either branches to block 902 for reading in more variables if available (then omitting block 903 as the split variables are already selected) or continues at block 907 exiting the procedure.

It should be noted that in FIG. 9 only a single run of the procedure is shown that ends up with a first allocation of data to a first set of sub-trees. However, the sub-trees themselves are still to be ordered in the same way. Therefore the procedure of FIG. 9 has to be repeated for every sub-tree. This will become clear from FIG. 10 which is described in the following.

Figure 10:
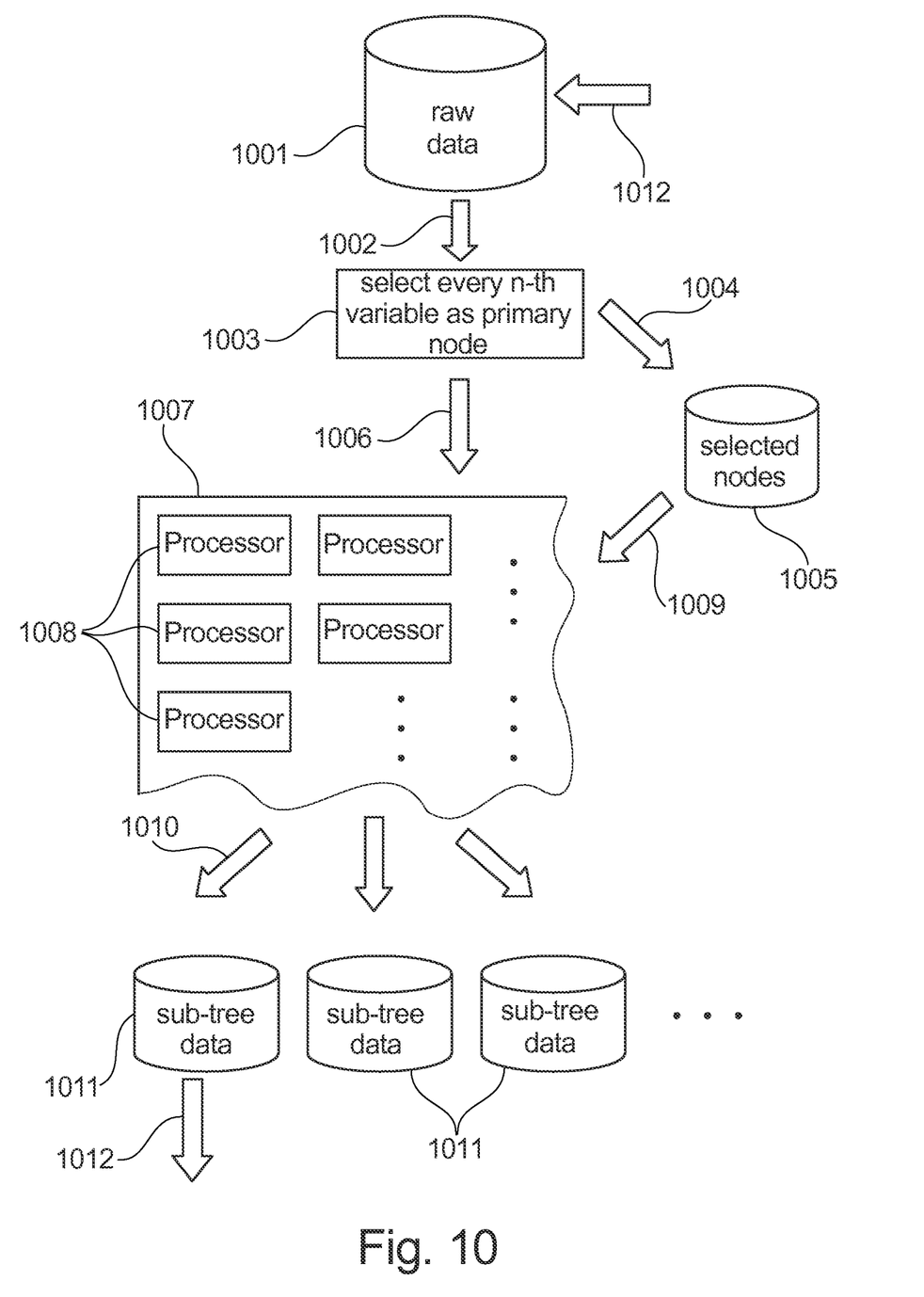
FIG. 10 shows schematically a block diagram of an embodiment of a computer system of the present invention.

FIG. 10 shows schematically a block diagram of an embodiment of a computer system. In a raw data memory 1001 raw data are stored for which a Bayesian tree is to be generated. Through channel 1002 the raw data are supplied from memory 1001 to the downstream processing means. In a selector 1003 nodes are separated from the raw data which will serve thereafter as representatives for a set of sub-trees. In a most primitive approach the selector separates every n-th variable as a primary node. Other selection algorithms can easily be devised by persons skilled in the art. From selector 1003 these nodes are stored in a node buffer 1005 via channel 1004. Whereas the selected variables are branched off to buffer 1005 in selector 1003, the remaining data are supplied from selector 1003 to a massively parallel processor array 1007 via channel 1006. The massively parallel processor array 1007 consists of a plurality of processors 1008 and respective control and cache memory means (not shown). At the same time as the processor array 1007 receives data from the selector 1003 it also receives data from the node buffer 1005 via a node supply channel 1009. As mentioned above with reference to FIG. 9 the processors 1008 correlate the nodes from buffer 1005 with the remaining data from selector 1003 and allocate the remaining data to sub-trees which are represented by their nodes via respective data supply channels 1010. Allocated data are buffered in corresponding sub-tree data memories 1011 depending on their correlation to the representing nodes. Since however the data in the sub-tree memories 1011 are still unordered, the procedure must be repeated until all data have been assigned to a node in the final Bayesian tree. Thus each sub-tree data memory 1011 has a sub-tree data output 1012 through which sub-tree data are fed back to the raw data memory 1001 in order to re-iterate the procedure for each sub-tree of first, second, and arbitrary order.

Depending on the computational balance between pass through the data and correlation computation time, a mixture of the new algorithm and of the original Chow-Liu algorithm may be applied in that some subgroups of variables are considered together and evaluated with a Chow-Liu algorithm.

It is also to be noted that tree-augmented networks (TAN) and multiple Bayesian networks (MTBN) can be learned in an instantiation of this method.

Potential industrial applications may be found in various fields. For instance, a Tree-shaped Bayesian networks, based on continuous variables, can be employed in data preparation for generalized linear models (GLM). The GLM may work with independent predictor variables. The tree-structure of a BN can be used to make the variables more independent in a particularly fast way.

Another application is for decision making where a version of tree-shaped BN is used, called tree-augmented network (TAN). Each decision class is assigned a tree with class-specific coefficients and the decision in a particular case is made on the grounds which network is more probable for the case.

A special case would be the so-called multiple Bayesian networks (MBN), used for decision making, and in particular the multiple tree-shaped Bayesian networks (MTBN). They assign each class a separate tree-shaped Bayesian network, that is they have potentially different structures for each class, while TAN was restricting itself to same structure for each class.

It will be clear to one of ordinary skill in the art that all or part of the method of various embodiments may suitably and usefully be embodied in additional logic apparatus or additional logic apparatuses, comprising logic elements arranged to perform the blocks of the method and that such logic elements may comprise additional hardware components, firmware components or a combination thereof.

It will be equally clear to one of skill in the art that some or all of the functional components of various embodiments may suitably be embodied in alternative logic apparatus or apparatuses comprising logic elements to perform equivalent functionality using equivalent method blocks, and that such logic elements may comprise components such as logic gates in, for example a programmable logic array or application-specific integrated circuit. Such logic elements may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

Various embodiments may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, using a modem or other interface device, over either a tangible medium, including but not limited to optical or analogue communications lines, or intangibly using wireless techniques, including but not limited to microwave, infra-red or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infra-red, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Various embodiments may be realized in the form of a computer implemented method of deploying a service comprising blocks of deploying computer program code operable to, when deployed into a computer infrastructure and executed thereon, cause the computer system to perform all the blocks of the method.

Various embodiments may be realized in the form of a data carrier having functional data thereon, said functional data comprising functional computer data structures to, when loaded into a computer system and operated upon thereby, enable said computer system to perform all the blocks of the method.

It will be clear to one skilled in the art that many improvements and modifications can be made to the foregoing exemplary embodiment without departing from the scope of the present invention.

What is claimed is:

1. A method for constructing a tree-shaped Bayesian network from a plurality of variables associated with conditional dependencies in a given data set, the constructing being performed by a plurality of processors in parallel, the method comprising:
    assigning the plurality of variables as nodes to the plurality of processors;
    randomly selecting M variables of the plurality of variables as primary nodes, the primary nodes defining (M+1) sub trees; and
    operating the plurality of processors in parallel to determine a correlation for remaining nodes and to allocate each remaining node to one of the (M+1) sub-trees,
    wherein the assigning, the randomly selecting, and the operating are iteratively repeated for each sub-tree until all of the nodes are linked in the tree-shaped Bayesian network.

2. The method according to claim 1, wherein an initial value of M equals 2 and defines 3 sub-trees.

3. The method according to claim 1, wherein a value of M is less than or equal to the square root of the number of the plurality of variables in the given data set.

4. A computer system for constructing a tree-shaped Bayesian network from variables associated with conditional dependencies in a given data set by a plurality of processors in parallel, the computer system comprising:
    a plurality of processors to which a respective plurality of variables is assigned to as nodes; and
    a controller configured to:
        randomly selecting M variables of the plurality of variables as primary nodes, the primary nodes defining (M+1) sub-trees, and
        operate the plurality of processors in parallel to determine a correlation for remaining nodes and to allocate each remaining node to one of the (M+1) sub-trees in each sub-tree,
    wherein the assignment, the random selection, and the operation are iteratively repeated for each sub-tree until all of the nodes are linked in the tree-shaped Bayesian network.

5. The computer system according to claim 4, wherein the controller sets an initial value of M to 2 to define 3 sub-trees.

6. The computer system according to claim 4, wherein the controller sets the value of M to less than or equal to the square root of the number of the plurality of variables in the given data set.

7. A computer program product for constructing a tree-shaped Bayesian network from a plurality of variables associated with conditional dependencies in a given data set by a plurality of processors in parallel, the computer program product comprising a computer readable medium having computer-readable program code embodied therewith, which when executed by a computer processor, causes the computer processor to implement:
    assigning the plurality of variables as nodes to the plurality of processors;
    randomly selecting M variables of the plurality of variables as primary nodes, the primary nodes defining (M+1) sub-trees, and
    operating the plurality of processors in parallel to determine a correlation for remaining nodes and to allocate each remaining node to one of the (M+1) sub-trees,
    wherein the assigning, the randomly selecting, and the operating are iteratively repeated for each sub-tree until all of the nodes are linked in the tree-shaped Bayesian network.

8. The computer program product according to claim 7, wherein an initial value of M equals 2 and defines 3 sub-trees.

9. The computer program product according to claim 7, wherein the value of M is less than or equal to the square root of the number of the plurality of variables in the given data set.

* * * * *